United States Patent [19]

Iida et al.

[11] Patent Number: 4,656,241

[45] Date of Patent: Apr. 7, 1987

[54] METHOD FOR PRODUCING POLYBUTYLENE TEREPHTHALATE

[75] Inventors: Hiroshi Iida, Matsuyama; Kunihiro Azuma, Ehime; Masahiko Hayashi, Iyo, all of Japan

[73] Assignee: Toray Industries Incorporated, Japan

[21] Appl. No.: 818,224

[22] Filed: Jan. 13, 1986

[30] Foreign Application Priority Data

Jan. 14, 1985 [JP] Japan ................................. 60-3262

[51] Int. Cl.$^4$ ..................... C08G 63/04; C08G 63/34
[52] U.S. Cl. .................................. 528/279; 528/283
[58] Field of Search ............................... 528/279, 283

[56] References Cited

U.S. PATENT DOCUMENTS

| | | | |
|---|---|---|---|
| 4,223,124 | 9/1980 | Broughton et al. | 528/279 X |
| 4,329,444 | 5/1982 | Borman | 528/279 X |
| 4,499,261 | 2/1985 | Heinze et al. | 528/279 |

*Primary Examiner*—Lucille M. Phynes
*Attorney, Agent, or Firm*—Scully, Scott, Murphy & Presser

[57] ABSTRACT

A method for producing of a polybutylene terephthalate by reacting a dicarboxylic acid component containing terephthalic acid as a main constituent directly with a glycol component containing 1,4-butanediol as a main constituent to form an esterification reaction product and subjecting the esterification reaction product to a polycondensation reaction, characterized in that 0.4 to 1.3 mole of 1,4-butanediol per mole of terephthalic acid is added in the presence of an esterification catalyst which is at least one member selected from the group consisting of titanium compounds and tin compounds, to start said esterification reaction and thereafter a required amount of 1,4-butanediol is supplied additionally to complete the esterification reaction.

6 Claims, No Drawings

METHOD FOR PRODUCING POLYBUTYLENE TEREPHTHALATE

BACKGROUND OF THE INVENTION

The present invention relates to a method for producing of a polybutylene terephthalate and more particularly to a method for producing of a polybutylene terephthalate (hereinafter referred to as "PBT") from terephthalic acid (hereinafter referred to as "TPA") and 1,4-butanediol (hereinafter referred to as "BG") both as essential monomers according to a direct polymerization process, in which BG is fed in steps to an esterification reaction process, i.e. a part of BG is added prior to the initiation of the reaction and the remaining is added during the reaction, which is preferably carried out under reduced pressure, thereby decreasing the amount of BG used in the esterification and at the same time decreasing the amount of tetrahydrofuran byproduced to obtain PBT of a good quality in a commercially advantageous manner.

PBT has heretofore been used widely as not only engineering plastics but also fibers, films and other functional resins because of its superior mechanical, chemical and physical properties.

There are two commercial or industrial manufacturing methods of PBT, one being a direct polymerization process which employs TPA as a starting dicarboxylic acid and a transesterification process which employs a lower alkyl ester of TPA. It is said that in the latter manufacturing process using such lower alkyl ester the polymer manufacturing cost is high in comparison with the direct polymerization process because the process using such lower alkyl ester goes through a transesterification process which is not found in the direct polymerization process and therefore the manufacturing process and conditions become complicated.

On the other hand, according to the direct polymerization process, BG as a reactant easily undergoes a cyclization reaction and is converted to tetrahydrofuran (hereinafter referred to as "THF") in an esterification reaction, so the esterification of TPA and BG will not proceed unless a large amount of BG is fed in this esterification reaction, thus resulting in that a large amount of BG is consumed and it is expensive to separate and recover the byproduced THF. This is a serious problem in industrial production.

From the standpoint of reducing the amount of BG used and suppressing the by-production of THF there have been proposed PBT manufacturing methods using one or both of an organotitanium compound and an organotin compound as a catalyst used in the direct polymerization process (see, for example, Japanese Pat. Publication No. 30010/80 or U.S. Pat. No. 3,936,421).

However, even if such a catalyst is selected, there is a limit in the reduction of the amount of BG used in the direct polymerization process, and where the total amount of BG used relative to TPA is small, the time required for the esterification reaction prolongs to a great extent and as the case may be the reaction is not completed, while even where the reaction is completed, a subsequent polycondensation reaction may not afford a polymer of a satisfactory quality.

On the other hand, the method of producing a polyethylene terephthalate (hereinafter referred to as "PET") using TPA and ethylene glycol (hereinafter referred to as "EG") as starting materials according to the above direct polymerization process is widely practised industrially as a PET manufacturing method although the polymer to be produced is different from that in the PBT manufacturing method of the present invention. In the direct polymerization process adopted in this PET manufacturing method, diethylene glycol (hereinafter referred to as "DEG") is byproduced DEG (see Japanese Patent Laid Open No. 41794/76).

However, between the direct polymerization process for PET and that for PBT there are differences in physical and chemical properties of the starting glycol components (EG and BG). For example, the boiling point of EG is 195° C. and according to ordinary esterification reaction conditions there is adopted a temperature (e.g. 220°–280° C.) above the boiling point of EG, so it is desirable to adopt a pressurized condition, while the boiling point of BG is 235° C. and an ordinary esterification reaction can be effected to a satisfactory extent event at a temperature (e.g. 180°–240° C.) below the boiling point of BG.

Besides, the production of PET and that of PBT according to the direct polymerization process are the same in that the esterification reaction is performed using a large excess of glycol relative to TPA. But in the direct polymerization process for PBT, it becomes very easy for BG to decompose in the presence of TPA, resulting in that BG is easily converted to THF, thus causing a lack of the starting material used for acceleration of the reaction. In the direct polymerization for PET, the decomposition of EG does not occur but DEG is produced and copolymerized with PET, thus resulting in deterioration of the quality of the polymer obtained. Thus, there are problems quite different from each other between the production of PET and that of PBT.

Further, in the direct polymerization process for PET there usually is adopted a means in which the divided addition of EG in its esterification reaction is made not to a reaction system of TPA alone but to a mixture of TPA and bis(hydroxyethyl)terephthalate (hereinafter referred to as "BHT") which is an initial reaction product of TPA and EG, as in the invention disclosed in the foregoing Japanese Patent Laid Open No. 41794/76.

As to the starting TPA, moreover, acetic acid used in an air oxidation of p-xylene remains in TPA which is produced by such air oxidation; more particularly, a small amount, usually about 0.003–0.3 wt. %, of such acetic acid is contained in the TPA. Where TPA containing such acetic acid is used as a starting material, the acetic acid easily reacts with BG to form glycol esters thereof such as mono- and diacetate of BG. These glycol esters of acetic acid have boiling points very close to the boiling point of BG and so it is impossible to easily separate the two in the recovery of BG. Particularly, in the case where the recovered BG is recycled and reutilized, glycol esters of acetic acid are gradually accumulated in BG and the concentration thereof becomes higher to the extent that it impedes the completion of the esterification reaction and the quality of the resulting PBT is impaired.

OBJECT AND SUMMARY OF THE INVENTION

It is the object of the present invention to provide a direct polymerization process capable of suppressing the production of THF caused by the decomposition of BG which is a side reaction peculiar to the direct polymerization process for PBT, greatly reducing the reaction mole ratio of BG to TPA and producing a high quality PBT efficiently in a short time.

DETAILED DESCRIPTION OF THE INVENTION

By the term "dicarboxylic acid containing TPA as a main component" used herein is meant TPA alone and a mixture of TPA and a dicarboxylic acid other than TPA in which at least 50 mol % of the total amount of acid component fed to the esterification reaction is TPA.

As examples of the dicarboxylic acid other than TPA are mentioned aromatic, aliphatic and alicyclic dicarboxylic acids such as isophthalic acid, naphthalenedicarboxylic acid, 1,4-cyclohexanedicarboxylic acid, diphenyldicarboxylic acid, diphenylmethanedicarboxylic acid, diphenylethanedicarboxylic acid, diphenyl ether dicarboxylic acid, adipic acid, sebacic acid, oxalic acid, dodecanedionic acid, trimellitic acid and 5-sodium sulfoisophthalic acid. These dicarboxylic acids may be used alone or in combination of two or more relative to TPA.

As the TPA as a starting material there may be used a TPA produced by an air oxidation of p-xylene, which contains, as previously noted, a small amount, preferably not more than 0.3 wt. % (3000 ppm), more preferably not more than 0.01 wt. % (100 ppm), of acetic acid.

By the term "glycol containing BG as a main component" which is a reactant with the dicarboxylic acid containing TPA as a main component, is meant BG alone or a mixture of BG and one or more of other glycols than BG in which at least 70 mol % of the total amount of glycol component fed to the esterification reaction is BG. As examples of other glycols than BG are mentioned EG, diethylene glycol, propylene glycol, polyethylene glycol, polypropylene glycol, polyethylene-propylene glycol, trimethylene glycol, polytetramethylene glycol, neopentyl glycol, hexanediol-1,6, pentaerythritol, cyclohexane-1,4-dimethanol, 2,2-bis(4-hydroxyphenyl)propane, 4,4'-dihydroxydiphenyl sulfone and xylene glycol.

The present invention is basically practised according to a batch process. Therefore, in subjecting the dicarboxylic acid (hereinafter referred to as "TPA") containing TPA as a main component and the glycol (hereinafter referred to as "BG") containing BG as a main component to an esterification reaction, it is necessary that after initiating the esterification reaction by mixing a predetermined amount of TPA with 0.4 to 1.3 mols, preferably 0.6 to 1.2 mols, of BG per mol of TPA, there should be made an additional supply of BG in an amount required for completing the reaction at a required time. If the molar ratio of BG fed at the beginning of the reaction exceeds 1.3 mols, it will be impossible to greatly reduce the amount of BG used throughout the esterification reaction because the amount of BG added in a divided amount after initiation of the esterification reaction is restricted. On the other hand, if it is less than 0.4 mol, the slurriness of the TPA-BG mixture will be deteriorated and the fluidity of the mixture itself will become insufficient, thus making a uniform esterification reaction difficult. Since the present invention adopts a batch process, it is desirable that the esterification reaction be performed in the same reaction system from the beginning to end in principle. But if necessary, the esterification may be performed in two or more reaction systems and BG may be divided and added over these two or more reaction systems.

Preferably, the esterification reaction in the present invention is carried out at a temperature in the range of 180° to 240° C. The esterification may be conducted while maintaining the temperature constant throughout the esterification process from the start up to completion of the esterification reaction (namely, up to when the conversion in the esterification reaction reaches 97%). Alternatively, the esterification reaction may be started within the above esterification reaction temperature range and thereafter the esterification reaction temperature may be raised as necessary.

The esterification reaction is conducted at a pressure usually in the range of 100 to 730 mmHg, but in order to suppress the decomposition of BG it is advantageous to start the esterification reaction under a slightly reduced pressure and increase the degree of pressure reduction halfway in the esterification reaction. If the esterification reaction is performed in the presence of excess BG relative to TPA and under a reduced pressure, free BG easily flows out of the reaction system, resulting in that a large amount of BG is consumed. But in the present invention, since the esterification reaction is started at a minimum molar ratio of BG to TPA, the amount of BG liberated in the esterification process is reduced, thus facilitating the execution of the esterification reaction under reduced pressure condition.

The present invention is characterized in that after the esterification reaction is started under such conditions, an additional supply of BG is made during progress of the esterification reaction. The amount of BG to be dividedly or additionally added differs according to molar ratios of BG to TPA in the entire process of the esterification reaction. More particularly, the total amount of BG used in the esterification reaction of the present invention is in the range of 1.05 to 2.0 in terms of molar ratio of BG to TPA. Where the amount of BG added at the beginning of the esterification reaction is small, the amount of BG to be added during progress of the esterification reaction can be increased, while if the amount of BG added at the beginning of the esterification reaction is large, the amount of BG to be added during progress of the esterification reaction can be made smaller. However, it is usually desirable that the amount of BG to be additionally supplied during progress of the esterification reaction after start thereof be in the range of 0.1 to 1.0, preferably 0.2 to 0.8 in terms of molar ratio of BG to TPA.

The means for such additional supply of BG after start of the esterification reaction is not specially limited. For example, there may be adopted means in which BG is added continuously after start of the esterification reaction, or means in which a remaining amount of BG is added at a time in a certain stage after start of the esterification reaction, or means in which BG is additionally supplied in two or more steps. Preferably, BG is added in steps in equal amounts during the period from the time when water produced by the esterification reaction after start of the same reaction begins to flow out until when the reaction is completed, that is, into a ternary reaction system of TPA, BG and oligobutylene terephthalate which is the reaction product of TPA and BG.

Preferably, a titanium compound and/or a tin compound, and more preferably both an organotitanium compound and an organotin compound, are used as an esterification catalyst in the above esterification reaction.

Examples of titanium compounds include oxides, hydrides, halides, organic acid salts and alcoholates of titanium, compounds of the general formula Ti(OR)$_4$ wherein R is a C$_1$ to C$_{10}$ alkyl or aryl, compounds of the general formula Ti(OR')$_{4-n}${OCH$_2$CH$_2$N(CH$_3$CH$_2$OH)$_2$}$_n$ wherein R' is a C$_1$ to C$_{10}$ alkyl or allyl and n is a numerical value in the range of 1 to 4, products obtained by transesterification reaction of the compounds of these general formulae with glycols or carboxylic acids, and hydrolyzates of the compounds of the above general formulae. More concretely, tetra-n-butoxy titanium, tetra-i-propoxy titanium, di-n-butoxybis(triethanolaminate) titanium and di-i-propoxybis(triethanolaminate) titanium are preferred.

As examples of tin compounds, mention may be made of compounds represented by the general formula

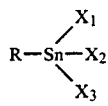

wherein R is an alkyl and X$_1$, X$_2$ and X$_3$, which may be the same or different, are each a monovalent radical selected from the group consisting of alkyl, aryl, acyloxy, cycloalkyl, hydroxy and halogen, and compounds represented by the general formula

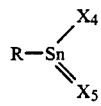

wherein R is alkyl, X$_4$ is a monovalent radical selected from the group consisting of alkyl, aryl, acyloxy, cycloalkyl, hydroxy and halogen, and X$_5$ is oxygen or sulfur atom.

More concrete examples of tin compounds represented by the above general formulae include methylphenyltin oxide, tetraethyltin oxide, dibutyltin oxide, didodecyltin oxide, triethyltin hydroxide, triphenyltin hydroxide, triisobutyltin acetate, dibutyltin diacetate, diphenyltin laurate, monobutyltin trichloride, dibutyltin chloride, tributyltin chloride, dibutyltin sulfide, monobutylhydroxytin oxide, monobutyltin triacetate, monobutyltin monoacetate, monobutyltin triethyl hexanoate and monobutyltin sulfide. Among these, monoalkyltin compounds are preferred. And these organotin compounds may be in an associated state of molecules of plural tin compounds or in an oligomerized state with some change.

The esterification catalyst just exemplified above is added in an amount in the range of 0.001 to 0.5 wt. %, preferably 0.01 to 0.2 wt. %, based on the weight of PBT obtained finally and it is desirable to add it into the reaction system before start of the esterification reaction.

As to solubility to the esterification reaction system, these titanium and tin compounds are dissolved in the esterification reaction system even under the foregoing reduced pressure condition without any trouble. But the catalytic activity may be lost by water which is produced as the esterification reaction proceeds, so in order to maintain the catalytic activity it is desirable to perform the esterification reaction under a reduced pressure or in an inert atmosphere.

After completion of the esterification reaction, the resulting product is subjected to a polycondensation reaction. Conditions for this polycondensation reaction conditions for PBT may be adopted. This reaction may be carried out at a temperature of 220° to 260° C. under a high vacuum in the presence of the foregoing titanium and tin compounds or a generally-known polyester polycondensation catalyst. process is reduced to a grear extent and the amount of THF byproduced is reduced, but also the amount of BG contained in the esterification reaction product can be minimized, therefore the amount of BG to be recovered in the polymerization reaction step becomes smaller and the polycondensation reaction involving removal of glycol can be allowed to proceed efficiently. As a result, the productivity and the energy-saving efficiency are improved. Thus, the PBT manufacturing method of the present invention are of a great technical and commercial significance.

The following examples are given to further illustrate the manufacturing method of the invention and its technical effect, in which examples the parts are by weight and the values of intrinsic viscosity have been obtained by measurement in orthochlorophenol at 25° C.

EXAMPLE 1

Using 755 parts of TPA and 614 parts of BG (molar ratio of BG/TPA: 1.5), an esterification reaction was performed, followed by a polycondensation reaction.

First, the total amount of TPA, 328 parts (molar ratio of BG/TPA: 0.8) out of the above amount of BG and 0.5 part of tetrabutyl titanate were charged into a reactor equipped with a rectification column and an esterification reaction was started at 180° C. under a reduced pressure of 500 mmHg. Thereafter, the temperature was raised gradually and the remaining amount of BG was added continuously. The reaction pressure was changed to 350 mmHg halfway in the reaction.

In 3 hours and 22 minutes (the temperature at that time was 240° C.) after start of the esterification reaction there was obtained a transparent reaction product. The percentage conversion was 98.4% and the amount of THF contained in the distillate was 75 parts.

0.5 part of tetrabutyl titanate was added to the reaction product, namely, bis (ω-hydroxybutyl)terephthalate and its low-molecular weight oligomer (BHBT) and a polycondensation reaction was conducted at 245° C. under a reduced pressure (not higher than 1 mmHg). After 3 hours and 30 minutes there was obtained a polymer having an intrinsic viscosity of 0.92.

COMPARATIVE EXAMPLE 1

755 parts of TPA, 614 parts of BG (molar ratio of BG/TPA: 1.5) and 0.5 part of tetrabutyl titanate were charged into a reactor equipped with a rectification column and an esterification reaction was started at 180° C. under a reduced pressure of 500 mmHg. Thereafter, the temperature was raised gradually until it finally reached 240° C.

Even in 4 hours and 30 minutes after start of the esterification reaction the reaction was not completed and so it was discontinued. The amount of THF contained in the distillate was 95 parts.

EXAMPLE 2

755 parts of TPA, 328 parts of BG (molar ratio of BG/TPA: 0.8) and 1.0 part of monobutylhydroxytin oxide were charged into a reactor equipped with a rectification column and an esterification reaction was started at 189° C. under a reduced pressure of 500 mmHg. Thereafter, the temperature was raised gradually and 164 parts of BG (molar ratio of BG/TPA: 0.4) were added continuously. The reaction pressure was changed to 350 mmHg halfway in the reaction.

In 3 hours and 10 minutes (the temperature at that time was 240° C.) after start of the esterification reaction there was obtained a transparent BHBT. The percentage conversion was 97.9% and the amount of THF contained in the distillate was 25 parts.

0.5 part of tetrabutyl titanate was added to the BHBT and a polycondensation reaction was conducted in the same way as in Example 1. After 3 hours and 20 minutes there was obtained a polymer having an intrinsic viscosity of 0.93.

COMPARATIVE EXAMPLE 2

755 parts of TPA, 491 parts of BG (molar ratio of BG/TPA: 1.2) and 1.0 part of monobutylhydroxytin oxide were charged into a reactor equipped with a rectification column and an esterification reaction was started at 189° C. under a reduced pressure of 500 mmHg. Thereafter, the temperature was raised gradually until it finally reached 240° C. The reaction pressure was changed to 350 mmHg halfway in the reaction.

Even in 4 hours and 30 minutes after start of the esterification reaction the reaction was not completed and so it was discontinued. The amount of THF contained in the distillate was 42 parts.

EXAMPLE 3

755 parts of TPA, 532 parts of BG (molar ratio of BG/TPA: 1.3), 0.5 part of tetraisopropyl titanate and 0.5 part of dibutylhydroxytin oxide were charged into a reactor equipped with a rectification column and an esterification reaction was started at 189° C. under a reduced pressure. Thereafter, the temperature was raised gradually and 82 parts of BG (molar ratio of BG/TPA: 0.2) was added continuously. The reaction pressure was changed to 350 mmHg halfway in the reaction.

In 3 hours and 10 minutes (the temperature at that time was 240° C.) after start of the esterification reaction there was obtained a transparent BHBT. The percentage conversion was 98.2%. The amount of THF contained in the distillate was 45 parts.

0.5 part of tetraisopropyl titanate was added to the BHBT and a polycondensation reaction was performed in the same way as in Example 1 to obtain a polymer having an intrinsic viscosity of 0.91.

EXAMPLE 4

Using 755 parts of TPA, 286 parts of BG (molar ratio of BG/TPA: 0.7), 0.5 part of tetrabutyl titanate and 0.5 part of monobutylhydroxytin oxide, an esterification reaction was started in the same way as in Example 3. Thereafter, the temperature was raised gradually and 205 parts of BG (mole ratio of BG/TPA: 0.5) was added continuously. The reaction pressure was changed to 350 mmHg halfway in the reaction.

In 3 hours and 51 minutes (the temperature at that time was 240° C.) after start of the esterification reaction there was obtained a transparent BHBT. The percentage conversion was 97.8% and the amount of THF contained in the distillate was 31 parts. Then, 0.5 part of tetrabutyl titanate was added to the BHBT and a polycondensation reaction was performed in the same manner as in Example 1 to obtain a polymer having an intrinsic viscosity of 0.90.

EXAMPLE 5

755 parts of TPA, 205 parts of BG (mole ratio of BG/TPA: 0.5), 0.5 part of tetraisopropyl titanate and 0.5 part of monobutylhydroxytin oxide were charged into a reactor equipped with a rectification column and an esterification reaction was started at 200° C. under a reduced pressure of 500 mmHg. Thereafter, the temperature was raised gradually and 286 parts of BG (mole ratio of BG/TPA: 0.7) was added continuously. The reaction pressure was changed to 350 mmHg halfway in the reaction.

In 4 hours (the temperature at that time was 240° C.) after start of the esterification reaction there was obtained a transparent BHBT. The percentage conversion was 98.2% and the amount of THF contained in the distillate was 34 parts.

0.5 part of tetraisopropyl titanate was added to the BHBT and a polycondensation reaction was performed in the same way as in Example 1 to obtain a polymer having an intrinsic viscosity of 0.88.

COMPARATIVE EXAMPLE 3

Using 755 parts of TPA, 123 parts of BG (mole ratio of BG/TPA: 0.3), 0.5 part of tetraisopropyl titanate and 0.5 part of monobutylhydroxytin oxide, an esterification reaction was started in the same way as in Example 6. But the reaction was discontinued because the slurriness was extremely inferior.

EXAMPLE 6

Using 1,132 parts of TPA containing 0.12% of acetic acid and 920 parts of BG (BG/TPA mole ratio: 1.5), an esterification reaction was conducted, followed by a polycondensation reaction.

First, the total amount of TPA, 490 parts (BG/TPA mole ratio: 0.8) out of the above amount of BG and 0.75 part of tetra-n-butyl titanate were charged into a reactor equipped with a rectification column and reaction was started at a pressure of 500 mmHg. Esterification reaction was allowed to proceed under the addition of the remaining 430 parts of BG (BG/TPA mole ratio: 0.7) while the temperature was raised gradually until it finally reached 235° C. The esterification reaction was completed after 3 hours and 15 minutes.

The reaction product was transferred into an autoclave and 0.75 part of tetra-n-butyl titanate was added. Then, the temperature was raised and the pressure reduced gradually until the temperature and the degree of vacuum reached 245° C. and 0.2 mmHg, respectively, after 1 hour, followed by a polycondensation reaction. After 3 hours and 30 minutes there was obtained a polymer having an intrinsic viscosity of 0.91.

COMPARATIVE EXAMPLE 4

In the above Example 6 the total amount of BG was fed at the beginning of reaction together with TPA and an esterification reaction was started at atmospheric pressure. The reaction temperature was raised gradually until it reached 240° C. after 3 hours and 30 minutes. Thereafter, the reaction was continued while maintaining the temperature at 240° C., but even after 5 hours the reaction was not completed and 170 parts of THF was byproduced, so the reaction was discontinued.

EXAMPLE 7

Using 1,132 parts of TPA containing 0.12% (based on TPA) of acetic acid and 798 parts of BG (BG/TPA mole ratio: 1.3), an esterification reaction was performed, followed by a polycondensation reaction.

First, the total amount of TPA, 552 parts of BG (BG/TPA mole ratio: 0.9) out of the above amount of BG, 0.75 part of tetra-n-butyl titanate and 0.6 part of monobutyltin hydroxide were charged into a reactor equipped with a rectification column and reaction was started at a pressure of 500 mmHg. Esterification reaction was allowed to proceed under the addition of the remaining 246 parts of BG (BG/TPA mole ratio: 0.4) while the temperature was raised gradually until it finally reached 240° C. The esterification reaction was completed after 3 hours and 10 minutes.

The reaction product was transferred into an autoclave and 0.75 part of tetra-n-butyl titanate was added. Thereafter, the temperature was raised and the pressure reduced gradually until the temperature and the degree of vacuum reached 247° C. and 0.1 mmHg, respectively, after 1 hour. After 3 hours and 25 minutes there was obtained 65 parts of a polycondensation distillate (BG 83.4%, ester of acetic acid and BG 4.1%, water 6.5% and THF 6%) together with a polymer having an intrinsic viscosity of 0.93.

Further, reaction was started by adding the catalyst to 1,132 parts of TPA containing 0.12% of acetic acid and 560 parts of BG (BG/TPA mole ratio: 0.9) mixed with 50 parts of the above polycondensation distillate in the same manner as above. Esterification reaction was allowed to proceed under the addition of 246 parts BG (BG/TPA mole ratio: 0.4) over a period of 2 hours while the temperature was raised gradually, followed by a polycondensation reaction.

Thus using a polycondensation distillate obtain in a previous batch as a part of BG, this experiment was repeated a total of ten times. In the tenth run, the total amount of acetic acid and BG ester thereof in the feed BG was 0.78% (based on TPA) in terms of acetic acid. The esterification time, percentage conversion in esterification, polycondensation time and intrinsic viscosity of polymer were as follows:

Esterification time: 3 hr. 45 min.
Percentage conversion in esterification: 97.5%
Polycondensation time: 3 hr. 35 min.
Intrinsic viscosity of polymer: 0.91

COMPARATIVE EXAMPLE 5

In Example 7 the total amount of 798 parts BG was used at the beginning of reaction, but the reaction was not completed.

EXAMPLE 8

In accordance with Example 1, 755 parts of TPA containing 0.08% of acetic acid, 410 parts (BG/TPA mole ratio: 1.6) out of a total BG amount of 655 parts and 0.75 part of a 75% di-n-butoxybis(triethanolaminate)titanium solution in n-butanol were charged into a reactor equipped with a rectification column and an esterification reaction was started at 180° C. and at 500 mmHg. The reaction was allowed to proceed under the addition of the remaining 245 parts of BG while the temperature was raised gradually until it finally reached 230° C. The esterification reaction was completed in 3 hours and 25 minutes after the start thereof. The amount of THF byproduced was 75 parts.

Part of the reaction product obtained was transferred into an autoclave and 0.075 part, based on 100 parts of the polymer produced, of the above titanium compound solution in n-butanol was further added. The pressure was gradually reduced at 245° C. and a polycondensation reaction was allowed to take place at a pressure not higher than 1 mmHg. After 3 hours and 30 minutes there was obtained a polymer having an intrinsic viscosity of 0.91 and superior in melt transparency. The solution haze of the polymer was 0.1%.

EXAMPLE 9

755 parts of TPA containing 0.02% acetic acid, 226 parts of isophthalic acid (IPA) containing 0.03% acetic acid, 327 parts of BG (BG/TPA+IPA mole ratio: 0.8), and as catalyst 0.63 part of an 80% di-i-propoxybis(triethanolaminate)titanium in i-butanol and 0.5 part of monobutyltin hydroxide, were charged into a reactor equipped with a rectification column and an esterification reaction was started at 180° C. under a reduced pressure of 500 mmHg. The temperature was raised gradually and additional 164 parts of BG (BG/dicarboxylic acid mole ratio: 0.4) was added continuously. The esterification reaction was completed in 3 hours and 34 minutes (the temperature at that time was 240° C.) after the start thereof. The percentage conversion was 98.4%.

Part of the reaction product obtained was transferred into an autoclave and 0.063 part, based on 100 parts of the polymer produced, of the above titanium compound solution in n-butanol was further added. The pressure was reduced gradually at 245° C. and a polycondensation reaction was allowed to take place at a pressure not higher than 1 mmHg. After 3 hours and 25 minutes there was obtained a polymer having an intrinsic viscosity of 0.91 and superior in melt transparency. The solution haze of the polymer was 0.4%.

EXAMPLE 10

1,132 parts of TPA containing 0.15% acetic acid, 552 parts of BG (BG/TPA mole ratio: 0.9), 1.3 parts of a 75% di-n-butoxybis(triethanolaminate)titanium solution in n-butanol and 0.7 part of monobutylhydroxytin oxide were charged into a reactor equipped with a rectification column and an esterification reaction was started in the same way as in Example 8. The reaction was allowed to proceed while adding 245 parts of BG continuously (BG/TPA mole ratio: 0.4). The esterification reaction was completed in 3 hours and 15 minutes after the start thereof.

The reaction product obtained was transferred into an autoclave, then 0.07 part, based on 100 parts of the polymer produced, of the above titanium compound solution in n-butanol was further added and a polycondensation reaction was allowed to take place in the same manner as in Example 8. After 3 hours and 35 minutes there was obtained a polymer having an intrinsic viscosity of 0.91 and superior in melt transparency. The solution haze of the polymer was 0.6%.

EXAMPLE 11

1,132 parts of TPA containing 0.15% acetic acid, 70 parts of the polycondensation distillate (a mixture of 86.3% BG, 1.5% ester of acetic acid and BG, 6.5% water and 5.7% THF) obtained in Example 10, 480 parts of BG, 1.3 parts of a 75% di-n-butoxybis(triethanolaminate)titanium solution in n-butanol and 0.7 part of monobutylhydroxytin oxide were charged into a reactor equipped with a rectification column and esterification was performed under the same conditions as in Example 1 while adding 246 parts of BG (BG/TPA mole ratio: 0.4), followed by a polycondensation reaction under the same conditions as in Example 10.

The reaction thus recycling and reusing BG distilled out from the polycondensation reaction step was repeated ten times. In the tenth run, 70 parts of the polycondensation distillate (consisting of 71% BG, 14% BG ester of acetic acid, 9% water and 6% THF) obtained in the previous run and 480 parts of BG were mixed and esterification was started. As a result of having conducted a test in the same manner as above, the esterification was completed in 3 hours and 30 minutes (percentage conversion in esterification: 98.3%) and a subsequent polycondensation was completed in 3 hours and 32 minutes. The resultant polymer had an intrinsic viscosity of 0.91. The amount of acetic acid and its BG ester present in the esterification reaction system was 1.0 wt. % based on TPA in terms of acetic acid.

What is claimed:

1. A method for producing polybutylene terephthalate comprising reacting, in a batch process, at a pressure in the range of between 100 and 730 mm Hg, a dicarboxylic acid component containing terephthalic acid as the main constituent directly with a glycol component containing 1,4-butanediol as the main constituent, said reaction characterized by the presence of 0.4 to 1.3 moles of 1,4-butanediol per mole of terephthalic acid at the initiation of the reaction and further characterized by the further addition of 1,4-butamediol during said reaction such that the total amount of 1,4-butanediol utilized in said reaction is in the range of between 1.05 and 2.0 moles per mole of terephthalic acid, said reaction ocurring in the presence of an esterification catalyst selected from the group consisting of titanium compounds, tin compounds and mixtures thereof whereby an esterification reaction product is formed; and subjecting said esterification reaction product to a polycondensation reaction.

2. A method as set forth in claim 1, wherein the amount of 1,4-butanediol added at the beginning of the esterification reaction is in the range of 0.6 to 1.2 moles per mole of terephthalic acid.

3. A method as set forth in claim 1 wherein the amount of 1,4-butanediol additionally supplied after the start of the esterification reaction is in the range of 0.1 to 1.0 mole per mole of terephthalic acid.

4. A method as set forth in claim 1, wherein said esterification catalyst is at least one member selected from the group consisting of:

tiranium compounds represented by the general formula $Ti(OR)_4$ where R is an alkyl or aryl; titanium compounds represented by the general formula $Ti(OR')_{4-n}\{OCH_2CH_2N(CH_3CH_2OH)_2\}_n$ where R' is an alkyl or allyl and n is a numerical value in the range of 1 to 4;

tin compounds represented by the general formula

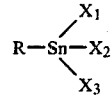

where R is an alkyl and $X_1$, $X_2$ and $X_3$, which may be the same or different, are each a monovalent radical selected from the group consisting of alkyl, aryl, acyloxy, cycloalkyl, hydroxy and halogen; and tin compounds represented by the general formula

where R is an alkyl, $X_4$ is a monovalent radical selected from the group consisting of alkyl, aryl, acyloxy, cycloalkyl, hydroxy and halogen, and $X_5$ is oxygen or sulfur atom.

5. A method as set forth in claim 1, wherein the esterification reaction is performed at a temperature in the range of 100° to 250° C., at a pressure not higher than atmospheric pressure and in the presence of acetic acid and a glycol ester thereof.

6. A method as set forth in claim 1, wherein the esterification temperature is in the range of 150° to 250° C. and 1,4-butanediol which is distilled out from the polycondensation reaction step is used as part of the 1,4-butanediol used in the esterification reaction step.

* * * * *

UNITED STATES PATENT AND TRADEMARK OFFICE
CERTIFICATE OF CORRECTION

PATENT NO. : 4,656,241

DATED : April 7, 1987

INVENTOR(S) : Hiroshi Iida, et al.

It is certified that error appears in the above-identified patent and that said Letters Patent is hereby corrected as shown below:

IN THE SPECIFICATION:

Column 1, line 27: "methods of" should read as --methods for--

Column 5, line 50: "witn" should read as --with--

Column 6, line 6: "catalyst. process is reduced" should read as --catalyst.-- as a new paragraph --According to the PBT manufacturing method of the present invention, not only the decomposition loss of BG in the conventional direct polymerization process is reduced--

Column 6, line 6: "grear" should read as --great--

UNITED STATES PATENT AND TRADEMARK OFFICE
CERTIFICATE OF CORRECTION

PATENT NO. : 4,656,241

DATED : April 7, 1987

INVENTOR(S) : Hiroshi Iida, et al.

It is certified that error appears in the above-identified patent and that said Letters Patent is hereby corrected as shown below:

IN THE CLAIMS:

Column 11, line 31, Claim 1: "1,4-butamediol" should read as --1,4-butanediol--

Column 12, line 6, Claim 4: "tiranium" should read as --titanium--

Signed and Sealed this

Twentieth Day of October, 1987

Attest:

DONALD J. QUIGG

*Attesting Officer*     *Commissioner of Patents and Trademarks*